(No Model.)
S. R. DRESSER.
PIPE COUPLING.
No. 389,797. Patented Sept. 18, 1888.
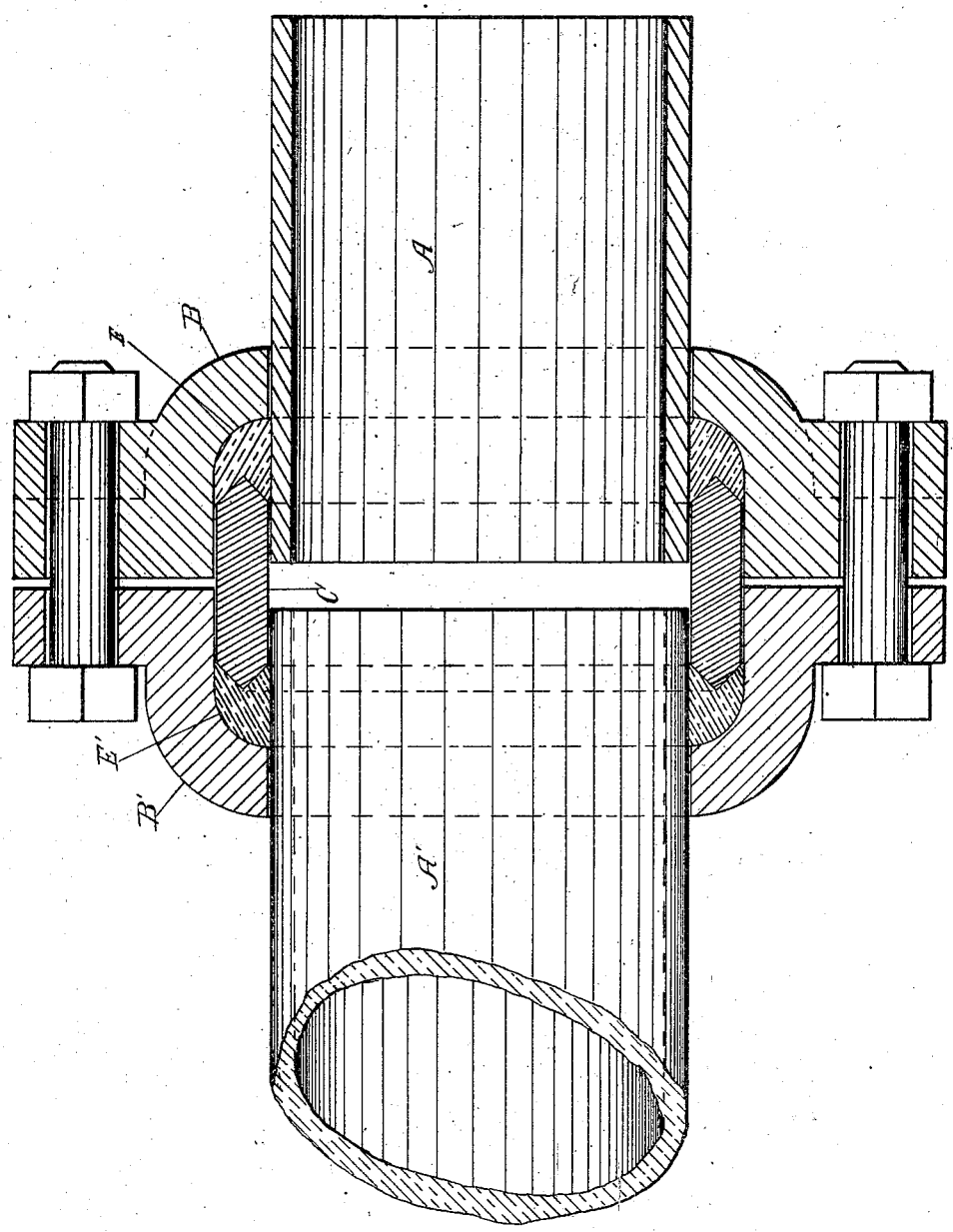
WITNESSES:
G. W. Cassedy
Geo. Smith
INVENTOR
Solomon R. Dresser

UNITED STATES PATENT OFFICE.

SOLOMON R. DRESSER, OF BRADFORD, PENNSYLVANIA.

PIPE-COUPLING.

SPECIFICATION forming part of Letters Patent No. 389,797, dated September 18, 1888.

Application filed March 18, 1887. Serial No. 231,395. (No model.)

*To all whom it may concern:*

Be it known that I, SOLOMON R. DRESSER, a citizen of the United States, residing at Bradford, in the county of McKean and State of Pennsylvania, have invented a new and useful Improvement in Pipe-Couplings, of which the following is a specification, such as will enable others skilled in the art to which it appertains to make and use the same.

The object of my invention is to provide a perfectly tight coupling for plain end pipe, and to provide for expansion and contraction without using the force or pressure of the gas or liquid conveyed in the pipe, as shown in my application filed February 26, 1887, series of 1880, No. 229,030.

The main feature or difference in this invention from the one referred to above is that instead of using two loose rings I use only one, and dispense with the rubber gasket H, and omit utilizing the force or pressure of the material conveyed in the pipes to assist in compressing the elastic packing by using mechanical means only to compress said packing.

The figure is a vertical longitudinal section of my coupling.

This coupling is put together the same as shown in Fig. 2 in my application of February 26, 1887, referred to above.

In joining pipes with this coupling, section B of coupling is slipped over pipe A. The elastic packing E is then slipped on pipe A. The loose ring C is then slipped on the pipe A so that the end of pipe A will come nearly to the center of loose ring C; then the other section of pipe-coupling, B', is slipped on the end of pipe A'; then the elastic packing E' is slipped on pipe A'; then the end of pipe A' is put into loose ring C so it will nearly, but not quite, abut the end of pipe A, and in line with each other; then the sections B and B' of coupling are drawn together, the bolts are put in the holes provided in the outer rim of coupling, and the nuts are put on the bolts and screwed up, which draws the sections of coupling together and forces the loose ring C against the elastic packings E and E', packing them tightly to the pipes and sections of coupling B and B', and at the same time the elastic packing-rings E and E' are packed tightly to the ends of loose ring C, thus making a perfectly tight packing at all exposed points of escape. This method of joining pipes makes a perfectly tight coupling, and at the same time provides for expansion and contraction, as each section of the pipe can contract or expand without having any effect or influence on the other section, because the pipes can slip in the packing-rings E and E'. Expansion is provided for by not abutting the ends of pipe when being laid. Leaving them apart from one-half to three-fourths of an inch in the loose ring C allows them to lengthen toward each other without the one crowding the other.

I am aware that pipe-couplings formed of two sections and having a metallic compressing-ring inclosed by the sections and rubber rings or packings which are square in cross-section and placed between the ends of the compressing-ring and the inside of the sections, so that when the sections are drawn together by means of bolts the rubber rings will be compressed against the side of the pipes to be coupled, are old. My device differs from such construction in that in the latter a uniform pressure along the face is impossible, as it is well known that rubber rings, whether square or round in cross-section, if compressed by pressing upon the ends, will have the greatest expansion at their peripheral center and gradually decreasing expansion toward the ends. I am also aware that similar couplings have been provided with compressible rings embedded in a groove in the outer surface of the pipes and a compressing-ring having semi-annular recesses in its ends for the rings. Such construction produces substantially the same result as the ring which is square in cross-section, but in a less degree, whereas in my device the inner faces of the couplings are curved, the compressing-ring has wedge-shaped ends, and the compressible rings conform to the shape of the space between the inner face of the sections and the compression-ring, so that the resultant of the forces exerted upon the compressible rings will cause a uniform pressure of the inner face of the ring against the pipes to be coupled.

Therefore what I claim as new is—

A pipe-coupling made in two sections, the inner faces of which are curved, and having a compressing-ring with wedge-shaped ends, and compressible rings conforming to the shape of and fitting within the space between the inner faces of the sections and the compressing-ring, substantially as described.

In testimony that I claim the foregoing as my own I have hereto affixed my signature in presence of two witnesses.

SOLOMON R. DRESSER.

Witnesses:
G. W. CASSEDY,
GEO. SMITH.